(12) United States Patent
Yim (10) Patent No.: US 7,746,374 B2
(45) Date of Patent: Jun. 29, 2010

(54) VIDEOCONFERENCE DATA RELAY SERVER

(75) Inventor: Wai Yim, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 1066 days.

(21) Appl. No.: 11/339,935

(22) Filed: Jan. 25, 2006

(65) Prior Publication Data

US 2007/0171274 A1     Jul. 26, 2007

(51) Int. Cl.
    *H04N 7/14*     (2006.01)
(52) U.S. Cl. .................................. 348/14.01; 709/204
(58) Field of Classification Search ................ 709/204;
                               370/260–261; 348/14.01–14.08
See application file for complete search history.

(56) References Cited

U.S. PATENT DOCUMENTS

| | | | |
|---|---|---|---|
| 6,219,706 B1 | 4/2001 | Fan et al. | |
| 6,915,331 B2* | 7/2005 | Fuller et al. | 709/204 |
| 7,120,928 B2* | 10/2006 | Sheth et al. | 709/204 |
| 7,164,435 B2* | 1/2007 | Wang et al. | 348/14.08 |
| 7,443,416 B2* | 10/2008 | Berenguer | 348/14.09 |
| 7,461,126 B2* | 12/2008 | Berkeland et al. | 709/204 |
| 7,574,472 B2* | 8/2009 | Biby et al. | 709/204 |
| 2003/0112823 A1 | 6/2003 | Collins et al. | |
| 2003/0154410 A1* | 8/2003 | Drell | 713/201 |
| 2003/0202088 A1* | 10/2003 | Knight | 348/14.08 |
| 2004/0047342 A1 | 3/2004 | Gavish et al. | |
| 2004/0077342 A1* | 4/2004 | Cho | 455/418 |
| 2004/0179092 A1* | 9/2004 | LaPoint | 348/14.08 |
| 2004/0223464 A1* | 11/2004 | Dye et al. | 370/260 |
| 2005/0033985 A1 | 2/2005 | Xu et al. | |
| 2005/0137960 A1* | 6/2005 | Brann et al. | 709/204 |
| 2005/0180342 A1* | 8/2005 | Summers et al. | 370/261 |
| 2005/0210292 A1 | 9/2005 | Adams et al. | |
| 2005/0283536 A1* | 12/2005 | Swanson et al. | 709/232 |
| 2006/0077252 A1* | 4/2006 | Bain et al. | 348/14.09 |

\* cited by examiner

*Primary Examiner*—Curtis Kuntz
*Assistant Examiner*—Maria El-Zoobi (57) ABSTRACT

A method, which may be implemented by an apparatus and/or computer program(s), for a data relay server comprises receiving a request to relay data for a videoconference between a videoconference server protected by a firewall and N videoconference clients not protected by the firewall, wherein $N \geq 1$; creating a connection pool in response to the request to relay the data for the videoconference comprising accepting a plurality of first connections from the videoconference server; accepting a plurality of second connections from each of the N videoconference clients after creating the connection pool; associating each of the second connections from each of the N videoconference clients with a different one of the first connections in the connection pool; and relaying the data for the videoconference between the videoconference server and the N videoconference clients over the first and second connections.

17 Claims, 6 Drawing Sheets

VIDEOCONFERENCE DATA RELAY SERVER

BACKGROUND

The present invention relates generally to data communications. More particularly, the present invention relates to videoconference data relay servers.

Figure 1:
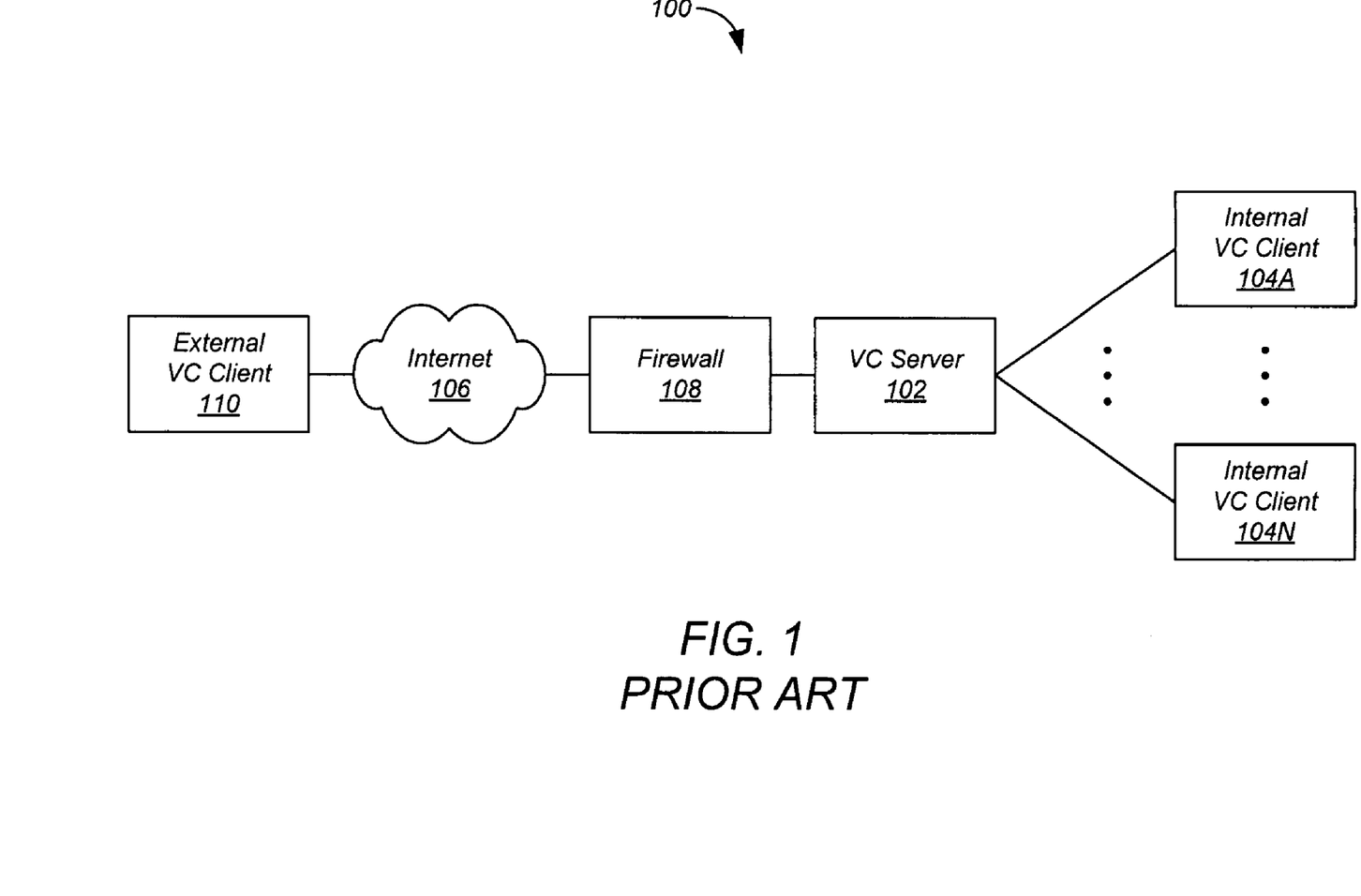
FIG. 1 shows a conventional videoconference system comprising a videoconference (VC) server and a plurality of internal videoconference clients that are engaged in one or more videoconferences and protected from a wide-area network (WAN) such as the Internet by a firewall.

FIG. 1 shows a conventional videoconference system 100 comprising a videoconference (VC) server 102 and a plurality of internal videoconference clients 104A-N that are engaged in one or more videoconferences and protected from a wide-area network (WAN) such as the Internet 106 by a firewall 108. Videoconference system 100 also includes one or more external videoconference clients 110 that are connected to Internet 106, but that are not protected by firewall 108.

It is often desirable to include one or more external videoconference clients 110 in a videoconference hosted by videoconference server 102 protected by firewall 108. One approach is to open firewall 108 in order to allow external videoconference clients 110 to connect to videoconference server 102. Of course this approach requires trusting external videoconference clients 110 with the consequent security risks such trust entails.

SUMMARY

In general, in one aspect, the invention features a method for a data relay server, the method comprising: receiving a request to relay data for a videoconference between a videoconference server protected by a firewall and N videoconference clients not protected by the firewall, wherein $N \geq 1$; creating a connection pool in response to the request to relay the data for the videoconference comprising accepting a plurality of first connections from the videoconference server; accepting a plurality of second connections from each of the N videoconference clients after creating the connection pool; associating each of the second connections from each of the N videoconference clients with a different one of the first connections in the connection pool; and relaying the data for the videoconference between the videoconference server and the N videoconference clients over the first and second connections.

In some embodiments, relaying the data for the videoconference between the videoconference server and the N videoconference clients over the first and second connections comprises: receiving first data over the first connections, and sending the first data over the respective second connections; and receiving second data over the second connections, and sending the second data over the respective first connections. Some embodiments comprise sending a connection pool identifier to the videoconference server in response to the request to relay data for the videoconference between the videoconference server and the N videoconference clients; wherein associating each of the second connections from each of the N videoconference clients with a different one of the first connections in the connection pool comprises receiving the connection pool identifier over each of the first connections, and associating each of the first connections with the connection pool identifier received over the first connection, receiving the connection pool identifier over each of the second connections, and associating each of the second connections with the connection pool identifier received over the second connection. Some embodiments comprise determining whether the data relay server has sufficient resources to relay the data for the videoconference between the videoconference server and the N videoconference clients; and relaying the data for the videoconference between the videoconference server and the N videoconference clients only when the data relay server has sufficient resources to relay the data for the videoconference between the videoconference server and the N videoconference clients.

In some embodiments, the request to relay data for the videoconference identifies a time slot for the videoconference; and determining whether the data relay server has sufficient resources to relay the data for the videoconference between the videoconference server and the N videoconference clients comprises determining whether the data relay server has sufficient resources to relay the data for the videoconference between the videoconference server and the N videoconference clients during the time slot.

Some embodiments comprise determining a connection type for each of the second connections; and securing each of the second connections in accordance with the connection type of the second connection. In some embodiments, the first connections comprise: Transport Control Protocol (TCP) connections protected by Secure Sockets Layer (SSL).

In some embodiments, the second connections comprise at least one of: Transport Control Protocol (TCP) connections protected by Secure Sockets Layer (SSL) Hyper-Text Transfer Protocol (HTTP) connections, and/or Secure HTTP (HTTPS) connections.

Some embodiments comprise an apparatus to perform the method.

Some embodiments comprise one or more computer programs for performing the method.

In general, in another aspect, the invention features a method for a videoconference server protected by a firewall, the method comprising: creating a connection pool between the videoconference server and a data relay server not protected by the firewall comprising initiating a plurality of first connections with the data relay server; sending invitations to a videoconference to N videoconference clients not protected by the firewall, wherein $N \geq 1$, wherein each of the invitations comprises an identifier of the data relay server, wherein each of the N videoconference clients initiates a plurality of second connections with the data relay server in response to the invitations after the videoconference server creates the connection pool; and exchanging data for the videoconference with the data relay server over the first connections, wherein the data relay server exchanges the data with the N videoconference clients over the second connections.

Some embodiments comprise sending, to the data relay server, a request to relay the data for the videoconference between the videoconference server and the N videoconference clients; receiving a connection pool identifier from the data relay server in response to the request to relay data for the videoconference between the videoconference server and the N videoconference clients; wherein creating the connection pool with the data relay server comprises sending the connection pool identifier over the first connections; wherein each of the videoconference invitations comprises the connection pool identifier; wherein each of the N videoconference clients receives a respective one of the videoconference invitations and sends the connection pool identifier in the videoconference invitation over each of the second connections between the videoconference client and the data relay server; and wherein the data relay server associates each of the second connections from each of the N videoconference clients with a different one of the first connections in the respective one of the N connection pools according to the connection pool identifiers.

In some embodiments, the first connections comprise: Transport Control Protocol (TCP) connections protected by Secure Sockets Layer (SSL).

Some embodiments comprise an apparatus to perform the method.

Some embodiments comprise one or more computer programs for performing the method.

In general, in another aspect, the invention features a method for a videoconference client, the method comprising: receiving an invitation to a videoconference from a videoconference server protected by a firewall that does not protect the videoconference client, wherein the videoconference invitation comprises a connection pool identifier and a data relay server identifier, wherein the data relay server identifier identifies a data relay server not protected by the firewall, and wherein the connection pool identifier identifies a connection pool comprising a plurality of first connections between the data relay server and the videoconference server; creating a plurality of second connections between the videoconference client and the data relay server, after creation of the first connections, in response to the invitation; and exchanging data for the videoconference with the data relay server over the second connections, wherein the data relay server exchanges the data for the videoconference with the videoconference server over the first connections.

In some embodiments, the videoconference server sends the connection pool identifier over each of the first connections, the method further comprising: sending the connection pool identifier over each of the second connections; wherein the data relay server associates each of the second connections with a different one of the first connections according to the connection pool identifiers.

In some embodiments, the second connections comprise at least one of: Transport Control Protocol (TCP) connections protected by Secure Sockets Layer (SSL) Hyper-Text Transfer Protocol (HTTP) connections, and/or Secure HTTP (HTTPS) connections.

Some embodiments comprise an apparatus to perform the method.

Some embodiments comprise one or more computer programs for performing the method.

The details of one or more implementations are set forth in the accompanying drawings and the description below. Other features will be apparent from the description and drawings, and from the claims.

The leading digit(s) of each reference numeral used in this specification indicates the number of the drawing in which the reference numeral first appears.

DETAILED DESCRIPTION

As used herein, the terms "client" and "server" generally refer to an electronic device or mechanism, and the term "message" generally refers to an electronic signal representing a digital message. As used herein, the term "mechanism" refers to hardware, software, or any combination thereof. These terms are used to simplify the description that follows. The clients, servers, and mechanisms described herein can be implemented on any standard general-purpose computer, or can be implemented as specialized devices.

Figure 2:
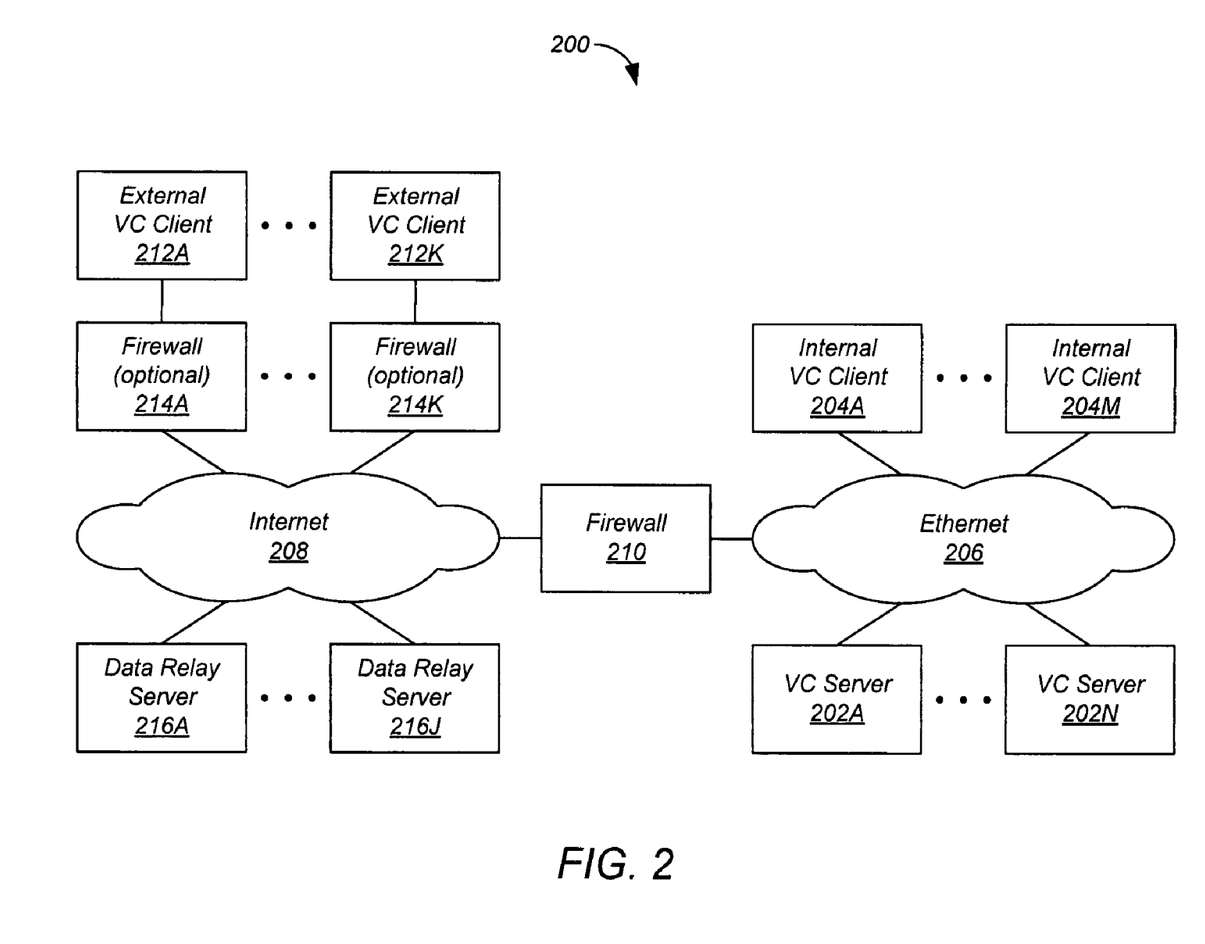
FIG. 2 shows a videoconference system according to a preferred embodiment of the present invention.

FIG. 2 shows a videoconference system 200 according to a preferred embodiment of the present invention. Videoconference system 200 comprises a plurality of videoconference servers 202A-N in communication with a plurality of internal videoconference clients 204A-M over a local-area network (LAN) such as Ethernet 206, and in communication with a wide-area network (WAN) such as the Internet 208. Videoconference system 200 is preferably implemented as a peer-to-peer system, but can also be implemented as a client-server system where one of videoconference servers 202 acts as a central server for managing client-server connections for all of the videoconferences.

Videoconference servers 202 and internal videoconference clients 204 are protected from Internet 208 by a conventional firewall 210. Videoconference system 200 also includes one or more external videoconference clients 212A-K that are connected to Internet 208, and that are not protected by firewall 210, but that may be protected by other firewalls such as optional conventional firewalls 214A-K. Videoconference system 200 also includes one or more data relay servers 216A-J to relay videoconference data between external videoconference clients 212 and videoconference servers 202, as described in detail below.

Figure 3:
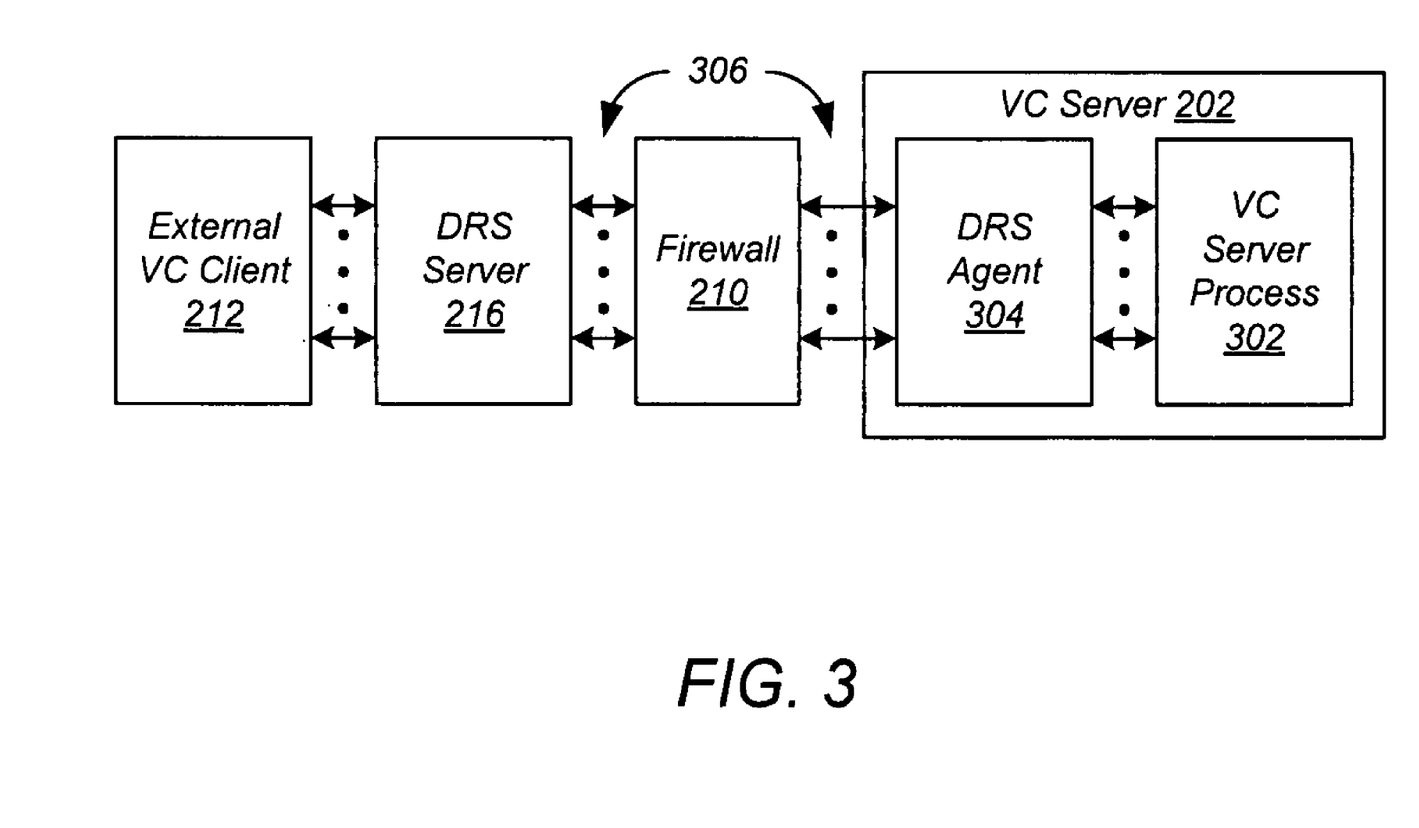
FIG. 3 shows detailed interaction between an external videoconference client and a videoconference server in the videoconference system of FIG. 2.
Figure 4:
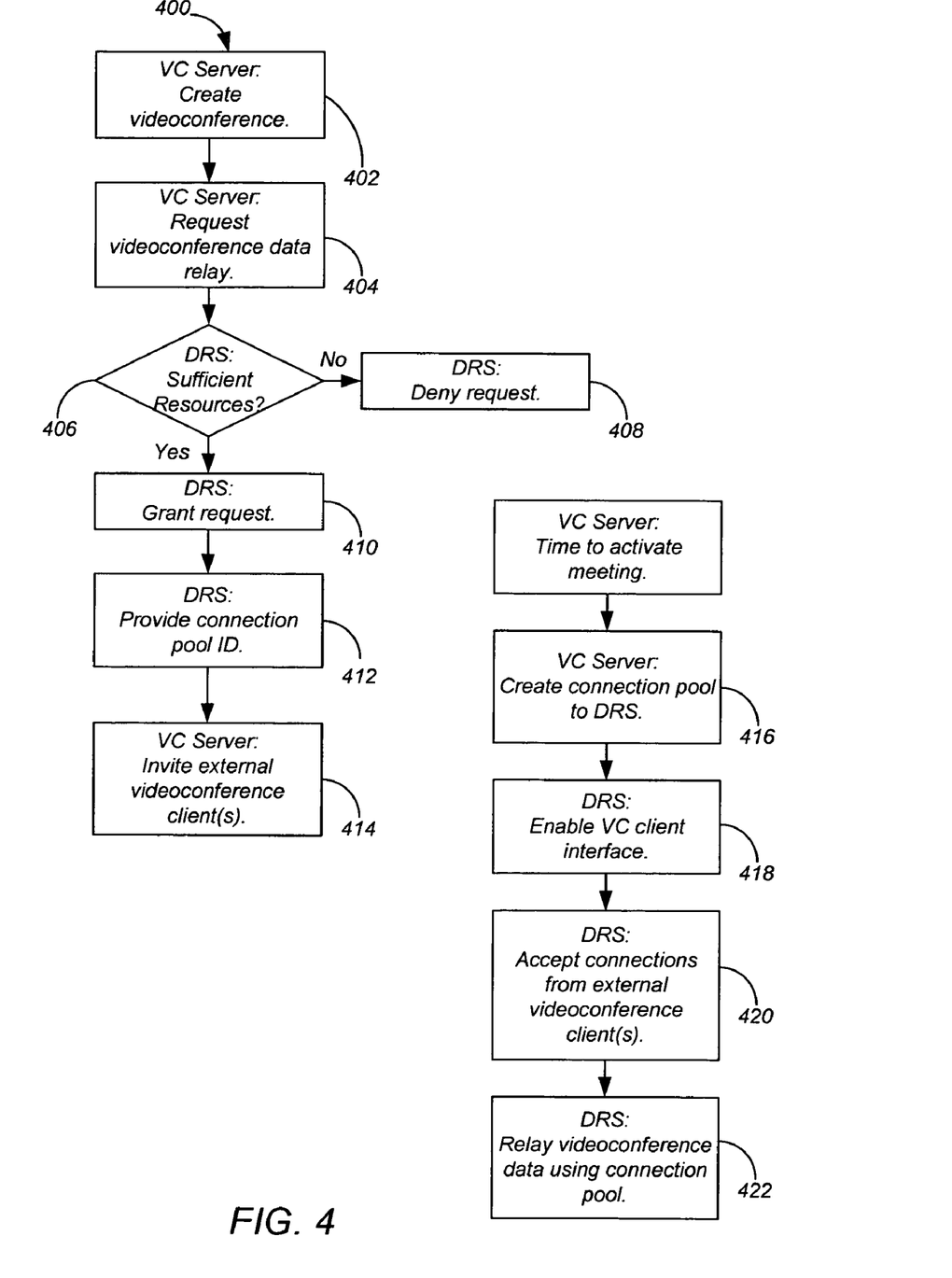
FIG. 4 shows a process for the videoconference system of FIG. 2 according to a preferred embodiment of the present invention.

FIG. 3 shows detailed interaction between an external videoconference client 212 and a videoconference server 202 in videoconference system 200 of FIG. 2. FIG. 4 shows a process 400 for videoconference system 200 of FIG. 2 according to a preferred embodiment of the present invention. Process 400 begins with the creation of a videoconference (step 402). The videoconference is preferably created by a user of one of videoconference clients 204 using a web-based interface to access a videoconference server process 302 executing on videoconference server 202, although other techniques can be used.

Figure 5:
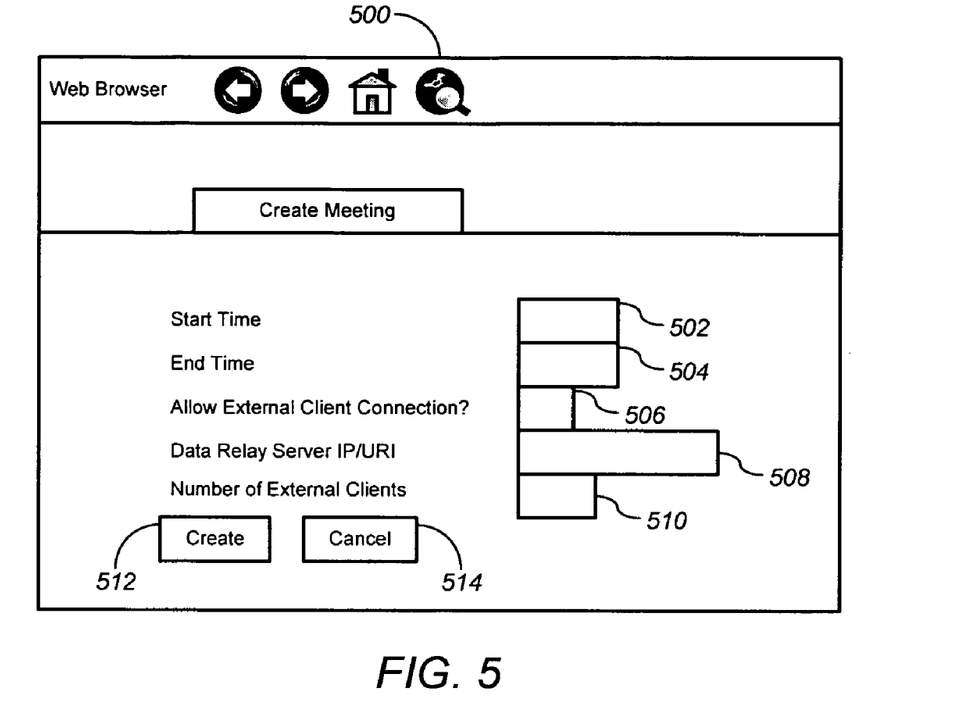
FIG. 5 shows a page presented by the videoconference servers of FIG. 2 when creating a videoconference according to a preferred embodiment of the present invention.

FIG. 5 shows a page 500 presented by videoconference server 202 when creating a videoconference according to a preferred embodiment of the present invention. Page 500 allows a user to specify the start and end times of the videoconference at 502 and 504, whether connections to external videoconference clients 212 are allowed at 506, the Internet Protocol (IP) address or Uniform Resource Locator (URL) of the data relay server 216 to be used at 508, and the number N of external videoconference clients to be connected to the videoconference at 510. Once these parameters are entered, the user can create the videoconference by selecting button 512, or can cancel the videoconference by selecting button 514.

If connections to external videoconference clients 212 are allowed for the videoconference, videoconference server 202 transmits a videoconference data relay request message to the data relay server 216 identified at 508 in FIG. 5 (step 404). The videoconference data relay request message identifies the number N of external videoconference clients 212 entered at 510 and a time slot for the videoconference based on the start and end times entered at 502 and 504. The videoconference data relay request message is preferably transmitted using a Transport Control Protocol (TCP) connection protected by Secure Sockets Layer (SSL), although other techniques can be used.

Data relay server 216 determines whether it has sufficient resources to grant the videoconference data relay request (step 406). Preferably each data relay server 216 is configured to support a predetermined maximum number of external videoconference clients 212 during any given time slot. Data relay server 216 preferably maintains a schedule of videoconferences and the number of external videoconference clients 212 to be supported for each videoconference, and consults this schedule when determining whether to grant a videoconference data relay request. If sufficient resources are not available, data relay server 216 denies the request (step 408), preferably by transmitting a videoconference data relay denial message to videoconference server 202.

If sufficient resources are available, data relay server 216 grants the request (step 410), preferably by transmitting a videoconference data relay grant message to videoconference server 202. Data relay server 216 also assigns a connection pool identifier (ID) to the videoconference, and provides the connection pool ID to videoconference server 202 (step 412). Each connection pool ID is unique so that no two videoconferences are assigned the same connection pool ID at the same time. Videoconference server 202 then invites external videoconference client 212 to the videoconference, preferably by emailing the URL of a web interface for the videoconference to external videoconference client 212 (step 414). The URL preferably includes the connection pool ID assigned to the videoconference. For example, the URL can have the form of HTTPS://DRSIP/Common/P2Pmeeting/CPID/Welcome.html, where DRSIP is the IP address or URL of the selected data relay server 216 and CPID is the connection pool identifier. The email preferably also includes the subject of the videoconference, the start and end times of the videoconference, and the like.

Then at some time prior to the start of the videoconference, for example 15 minutes before the videoconference's scheduled start time, process 400 creates a connection pool 306 comprising a plurality of connections between data relay server 216 and videoconference server 202 (step 416). Preferably videoconference server 202 launches a data relay server (DRS) agent 304 that initiates the connections, which are then accepted by data relay server 216. Preferably the connections comprise TCP connections protected by SSL, although other types of connections can be used. Preferably videoconference server 202 initiates the TCP connections to data relay server 216, which accepts the connections.

Each connection pool (and therefore each videoconference) is assigned a unique connection pool identifier. The initial data sent over each connection includes the respective connection pool identifier, as well as a connection type identifier such as those described below. Data relay server 216 associates each of the connections with the respective connection pool identifier.

Figure 6:
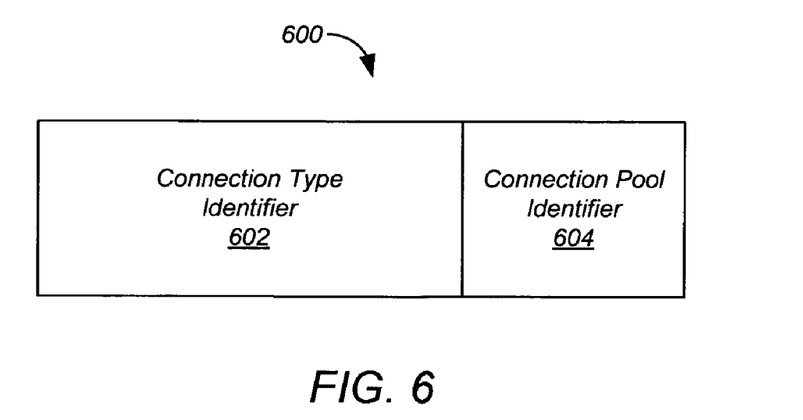
FIG. 6 shows the format of a connection identifier comprising a connection pool identifier and a connection type identifier according to a preferred embodiment of the present invention.

For TCP connections, the first block of data (that is, the stream header) sent over the TCP connection includes a connection identifier. FIG. 6 shows the format of a connection identifier 600 according to a preferred embodiment of the present invention. Connection identifier 600 comprises a connection type identifier 602 followed by a connection pool identifier 604.

Preferably connection type identifier 602 occupies the first eight bytes of connection identifier 600, while connection pool identifier 604 occupies the next four bytes. Table 1 below shows values for connection type identifier 602 for different types of TCP connections according to a preferred embodiment of the present invention. Referring to Table 1, all of the connections in a connection pool are of the same type (Pool Connection), and so have the same value for connection type identifier 602. The remaining connection types shown in Table 1 are created by external videoconference client 212, as described in detail below. All incoming connections to data relay server 216 that do not start with one of the connection types in Table 1 are treated as HTTP or HTTPS connections from external videoconference client 212.

TABLE 1

| Connection Type | Connection Type Identifier Value |
| --- | --- |
| Pool Connection | FF FF F8 FF FF FF F8 FF |
| Videoconference Audiovisual Data Connection | FF FF F8 FF FF FF F4 FF |
| Command Connection | FF FF F8 FF FF FF F2 FF |
| Document Connection | FF FF F8 FF FF FF F6 FF |

If an attempt to create a connection fails, videoconference server 202 will try again. Preferably videoconference server 202 waits for a predetermined interval, for example on the order of two minutes, before trying again in order to avoid flooding data relay server 216 with connection requests.

At the start time of the videoconference, data relay server 216 enables a videoconference client interface, preferably by enabling a web interface for the videoconference at the URL contained in the email invitations to the videoconference (step 418). External videoconference client 212 preferably uses a browser to navigate to the web interface, which preferably presents a welcome page. Preferably this exchange occurs via data relay server 216 using one of the pool connections for the videoconference.

Figure 7:
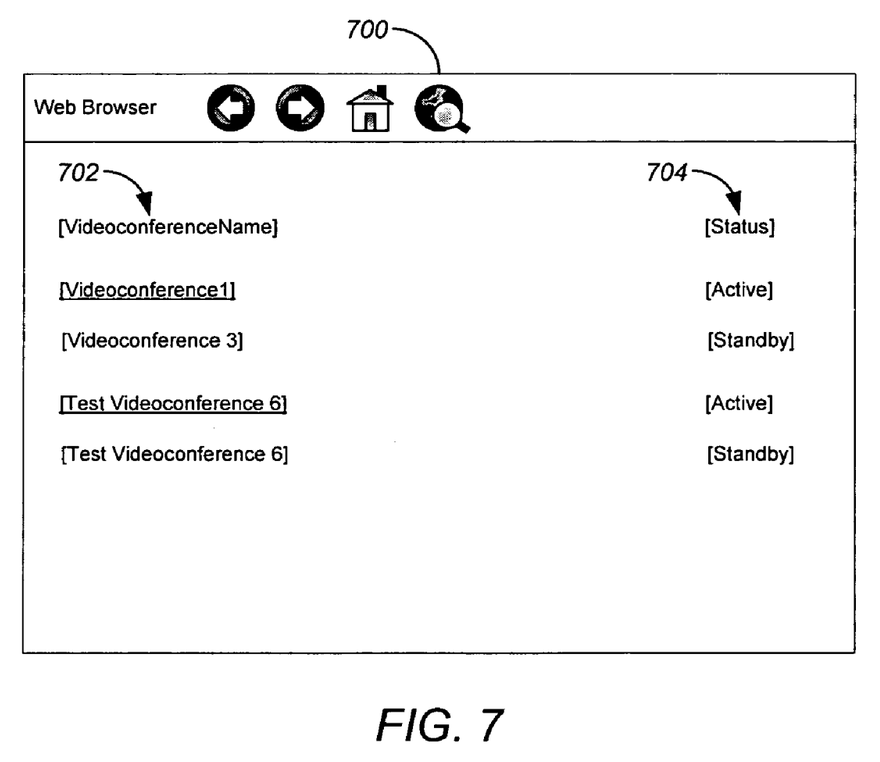
FIG. 7 shows an example welcome page from a web interface according to a preferred embodiment of the present invention.

FIG. 7 shows an example welcome page 700 from the web interface according to a preferred embodiment of the present invention. Welcome page 700 lists the available videoconferences at 702 and the status of each videoconference at 704. The active videoconferences (that is, those videoconferences that have established connection pools 306 and enabled web interfaces) are displayed as hyperlinks which initiate the selected videoconference, preferably by redirecting a browser application executing on external videoconference client 212 to a web-based login page on a videoconference server 202 where, after user authentication, an external videoconference application is launched. The videoconference client application creates one or more connections to data relay server 216, which data relay server 216 accepts (step 420), in response to the respective videoconference invitation, and after creation of the respective connection pool 306. Preferably the connections comprise TCP connections protected by SSL, HTTP connections, and HTTPS connections, although other types of connections can be used.

The videoconference client application on external videoconference client 212 initiates one or more connections to data relay server 216, which data relay server 216 accepts, and begins to send/relay data over the connections. The initial data sent over each of these connections comprise a connection pool identifier and a connection type identifier, for example as described above for connections in the connection pools. Data relay server 216 uses the connection pool identifiers to associate each of these connections with one of the connections in the corresponding connection pool 306.

Data relay server 216 determines the type of each connection with external videoconference client 212, preferably according to the following process. Data relay server 216 reads the first 8 bytes of data received over the connection. If the first 8 bytes match any of the connection type identifier values, the connection type is selected using Table 1 above. Data relay server 216 then reads the next 4 bytes to obtain the associated connection pool ID (except for command connections that are not associated with a connection pool ID, for example, a command to create a videoconference).

But if the first 8 bytes of data do not match any of the connection type identifier values, data relay sever 216 determines whether the first 8 bytes represent a valid HTTP command such as GET, POST, and the like. If so, the connection type is HTTP. Otherwise, data relay server 216 assumes the connection type is HTTPS, and therefore attempts a SSL handshake with the connection. If the SSL handshake fails, data relay server 216 assumes the connection is misplaced. But if the SSL handshake succeeds, data relay server 216 reads the connection pool ID from the HTTP path information, as described above.

Data relay server 216 preferably uses the connection type of each connection to secure the connection using the different security mechanisms employed by each connection type. For example, for the videoconference audiovisual, document, command, and pool connections, SSL encryption occurs after the stream header block. However, for HTTPS connections, SSL encryption is the first action taken by data relay server 216. And for HTTP connections, there is no SSL encryption. However, because data relay server 216 is preferably a secured server, data relay server 216 sends back URL redirect for regular HTTP connections to use HTTPS connections instead.

Data relay server 216 then relays the data for the videoconference between videoconference server 202 and each external videoconference client 212 using the connection associations (step 422). Preferably data relay server executes two threads for this purpose. One thread relays data from external videoconference clients 212 to videoconference server 202, while the other thread relays data from videoconference server 202 to external videoconference clients 212.

Data relay server 216 receives data over the connections with external videoconference clients 212, and transmits the data to videoconference server 202 over the corresponding connections in the connection pool 306 for the videoconference according to the connection associations. Data relay server 216 also receives data for the videoconference from videoconference server 202 over the connections in the connection pool 306 for the videoconference, and transmits the data over the corresponding connections to external videoconference clients 212 according to the connection associations.

In some cases, such as with an HTTP communication, the connection used from the connection pool 306 will be closed at the end of the communication. When this happens, videoconference server 202 preferably creates a new connection in the connection pool 306 to replace the closed connection, thereby ensuring a sufficient number of connections in the connection pool 306 to support the videoconference.

The invention can be implemented in digital electronic circuitry, or in computer hardware, firmware, software, or in combinations of them. An apparatus of the invention can be implemented in a computer program product tangibly embodied in a machine-readable storage device for execution by a programmable processor of the apparatus; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the above-mentioned programs can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A method for a data relay server, the method comprising:
the data relay server performing the operations of:
receiving a request from a videoconference server to relay data for a videoconference between the videoconference server protected from the data relay server by a firewall and N videoconference clients not protected from the data relay server by the firewall, wherein $N \geq 1$;
creating a connection pool in response to the request to relay the data for the videoconference comprising accepting at least one first connection from the videoconference server;
accepting at least one second connections from each of the N videoconference clients after creating the connection pool;
associating each second connection, one from each of the N videoconference clients, with a different one of the at least one first connections in the connection pool; and
relaying the data for the videoconference between the videoconference server and the N videoconference clients over the first and second connections.

2. The method of claim 1, wherein relaying the data for the videoconference between the videoconference server and the N videoconference clients over the first and second connections comprises:

receiving first data over the at least one first connection, and sending the first data over the associated at least one second connections; and receiving second data over the at least one second connection, and sending the second data over the associated at least one first connections.

3. The method of claim 1, further comprising:

sending a connection pool identifier to the videoconference server in response to the request to relay data for the videoconference between the videoconference server and the N videoconference clients;

wherein associating each second connection, from each of the N videoconference clients, with a different one of the at least one first connections in the connection pool comprises receiving the connection pool identifier over each of the at least one first connection, and associating each of the at least one first connection with the connection pool identifier, receiving the connection pool identifier over each of the at least one second connections, and associating each of the at least one second connections with the connection pool identifier.

4. The method of claim 1, further comprising:

determining whether the data relay server has sufficient resources to relay the data for the videoconference between the videoconference server and the N videoconference clients; and relaying the data for the videoconference between the videoconference server and the N videoconference clients only when the data relay server has sufficient resources to relay the data for the videoconference between the videoconference server and the N videoconference clients.

5. The method of claim 4:

wherein the request to relay data for the videoconference identifies a time slot for the videoconference; and wherein determining whether the data relay server has sufficient resources to relay the data for the videoconference between the videoconference server and the N videoconference clients comprises determining whether the data relay server has sufficient resources to relay the data for the videoconference between the videoconference server and the N videoconference clients during the time slot.

6. The method of claim 1, further comprising:

determining a connection type for each of the at least one second connections; and securing each of the at least one second connections in accordance with the connection type determined for that second connection.

7. The method of claim 1, wherein each of the at least one first connections comprises:

a Transport Control Protocol (TCP) connections protected by Secure Sockets Layer (SSL).

8. The method of claim 1, wherein each of the at least one second connections comprises at least one of:

a Transport Control Protocol (TCP) connections protected by Secure Sockets Layer (SSL)

a Hyper-Text Transfer Protocol (HTTP) connections, or a Secure HTTP (HTTPS) connections.

9. A machine-readable medium embodying a computer program for execution by one or more processors of or in communication with the data relay server for performing the method of claim 1.

10. A method for a videoconference server protected by a firewall, the method comprising:

the videoconference server performing the operations of:

creating a connection pool between the videoconference server and a data relay server comprising initiating at least one first connections with the data relay server;

sending invitations to a videoconference to N videoconference clients not protected from the data relay server by the firewall, wherein $N \geq 1$ wherein each of the invitations comprises an identifier of the data relay server, wherein each of the N videoconference clients initiates a second connections with the data relay server in response to the invitations after the videoconference server creates the connection pool; and exchanging data for the videoconference with the data relay server over the at least one first connections, wherein the data relay server exchanges the data with each of the N videoconference clients over the second connection for that videoconference client.

11. The method of claim 10, further comprising:

sending, to the data relay server, a request to relay the data for the videoconference between the videoconference server and the N videoconference clients;

receiving a connection pool identifier from the data relay server in response to the request to relay data for the videoconference between the videoconference server and the N videoconference clients;

wherein creating the connection pool with the data relay server comprises sending the connection pool identifier over each of the at least one first connections;

wherein each of the videoconference invitations comprises the connection pool identifier;

wherein each of the N videoconference clients receives a respective one of the videoconference invitations and sends the connection pool identifier in the videoconference invitation over the second connections between that videoconference client and the data relay server; and wherein the data relay server associates each second connection, one from each of the N videoconference clients with a different one of the at least one first connections in the respective one of the N connection pools according to the connection pool identifiers.

12. The method of claim 10, wherein each of the at least one first connections comprises:

a Transport Control Protocol (TCP) connections protected by Secure Sockets Layer (SSL).

13. A machine-readable medium embodying a computer program for execution by one or more processors of or in communication with the videoconference server for performing the method of claim 10.

14. A method for a videoconference client, the method comprising:

the videoconference client performing the operations of:

receiving an invitation to a videoconference from a videoconference server protected from the videoconference client by a firewall, wherein the videoconference invitation comprises a connection pool identifier and a data relay server identifier, wherein the data relay server identifier identifies a data relay server not protected from the videoconference client by the firewall, and wherein the connection pool identifier identifies a connection pool comprising at least one first connections between the data relay server and the videoconference server;

creating at least one second connection between the videoconference client and the data relay server, after creation of the at least one first connections, in response to the invitation; and exchanging data for the videoconference with the data relay server over the at least one second connections, wherein the data relay server exchanges the data for the videoconference with the videoconference server over the at least one first connections.

15. The method of claim 14, wherein the videoconference server sends the connection pool identifier over each of the at least one first connections, further comprising:
   sending the connection pool identifier over each of the at least one second connections;
   wherein the data relay server associates each of the at least one second connections with a different one of the at least one first connections according to the connection pool identifiers.

16. The method of claim 14, wherein the at least one second connections comprises at least one of:
   a Transport Control Protocol (TCP) connections protected by Secure Sockets Layer (SSL)
   a Hyper-Text Transfer Protocol (HTTP) connections, or
   a Secure HTTP (HTTPS) connections.

17. A machine-readable medium embodying a computer program for execution by one or more processors of or in communication with the videoconference client for performing the method of claim 14.

* * * * *

UNITED STATES PATENT AND TRADEMARK OFFICE
CERTIFICATE OF CORRECTION

PATENT NO. : 7,746,374 B2  Page 1 of 2
APPLICATION NO. : 11/339935
DATED : June 29, 2010
INVENTOR(S) : Wai Yim It is certified that error appears in the above-identified patent and that said Letters Patent is hereby corrected as shown below:

Column 8,   line 55, change "connections" to --connection-- line 60, change "connections" (first occurrence) to --connection--

Column 9,   line 3, change "connections" to --connection-- line 6, change "connections" to --connection-- line 14, change "connections" (first occurrence) to --connection-- line 21, change "connections" to --connection-- line 22, change "connections" to --connection-- line 48, change "connections" to --connection-- line 49, change "connections" to --connection-- line 53, change "connections" to --connection-- line 54, change "connections" to --connection-- line 57, change "connections" to --connection-- line 58, change "connections" to --connection-- line 60, change "connections" to --connection-- line 61, change "connections" to --connection--

Column 10,  line 4, change "connections" to --connection-- line 10, change "second connections" to --second connection-- line 14, change "connections" to --connection-- line 28, change "connections" to --connection-- line 34, change "connections" to --connection-- line 39, change "connections" to --connection--

Signed and Sealed this

Twenty-sixth Day of October, 2010

David J. Kappos
*Director of the United States Patent and Trademark Office*

|            | line 41, change "identifiers" to --indentifier-- |
|------------|---------------------------------------------------|
|            | line 43, change "connections" to --connection-- |
|            | line 44, change "connections" to --connection-- |
|            | line 61, change "connections" to --connection-- |
|            | line 65, change "connections" to --connection-- |
| Column 11, | line 2, change "connections" to --connection-- |
|            | line 5, change "connections" to --connection-- |
|            | line 8, change "connections" to --connection-- |
|            | line 10, change "connections" to --connection-- |
|            | line 12, change "connections" to --connection-- |
|            | line 13, change "connections" to --connection-- |
| Column 12, | line 2, change "connections" to --connection-- |